July 11, 1967 L. T. BROWN 3,330,638
METHOD OF FEEDING MIXED COLORANTS TO GLASS IN THE FOREHEARTH
Filed May 27, 1964
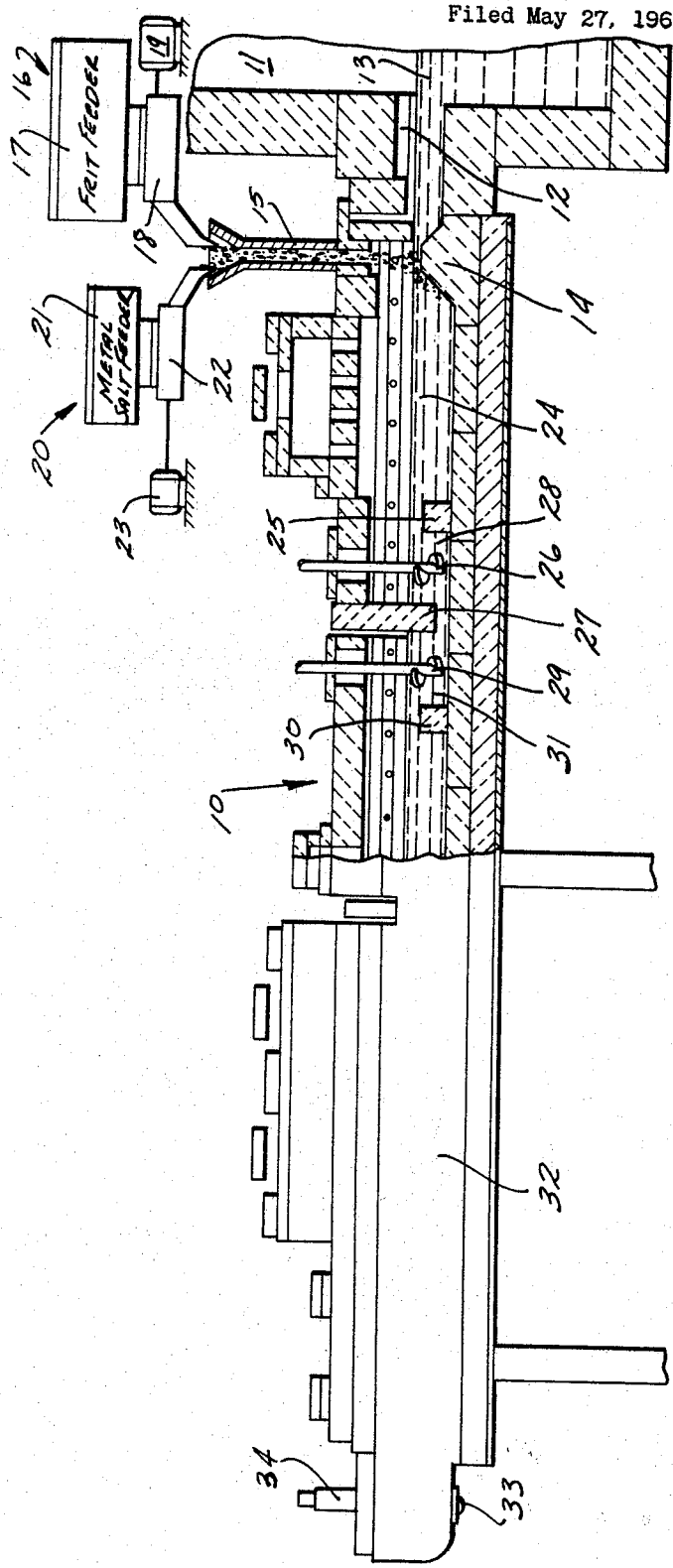
INVENTOR.
LEWIS T. BROWN
BY
J. R. Nelson and
W. A. Schaich
ATTORNEYS 3,330,638
METHOD OF FEEDING MIXED COLORANTS TO GLASS IN THE FOREHEARTH
Lewis T. Brown, Lafayette, Calif., assignor to Owens-Illinois, Inc., a corporation of Ohio
Filed May 27, 1964, Ser. No. 370,420
1 Claim. (Cl. 65—134)

The present invention relates to a method of manufacturing a colored glass or changing the color properties of a colored glass by addition of a combination of colorant materials in a forehearth.

In prior practice, highly enriched colorant frits containing colorant ingredients have been made and reduced to a dry pulverant state. These frits are added to a base glass flowing in the forehearth of a continuous melting tank and therein mixed and dispersed to form a homogeneously colored glass. In the manufacture of green colored glasses, the principal ingredient of the frit is obtained in a chromate compound $Cr_2O_3$. The solubility of chromium in the glassy matrix of the frit achieves a maximum point of about 1.5% $Cr_2O_3$.

This invention has as its object the inclusion of inorganic metallic salts having a melting point equal to or less than forehearth temperatures to be added with and as a supplement to a glass frit colorant containing up to 1.5% $Cr_2O_3$. This supplement of an inorganic metallic salt, as aforesaid, will strengthen the colorant characteristic and require less frit than heretofore, thus reducing the problems in connection with frit additions for forehearth colorant of green glasses. With the chromium salts used today to produce green glasses, the concentration required in the glass frit exceeds the solubility of chromium in glass. By adding a chrome salt, diluted with the forehearth soluble frit, the desired chrome concentrations in the finished glass is obtained without difficulty.

By the herein disclosed method, the problems of crystallization which often occur in frits containing high or higher proportions of chromium oxide, is overcome. The crystallized oxides will in the solidification and manufacturing steps of preparing the frit, create crystals which generally show up in a composite glass. A further problem results in the addition of large amounts of solid frits causing heat losses incurred upon admixing a frit with the molten base glass in the quantities necessary. It is also more economical to manufacture the green glass by the herein proposed method.

Other objects of this invention will appear in the following description and dependent claims.

In the accompanying drawing, one exemplary form of apparatus for carrying out the method of the invention, is illustrated. The single figure of the drawing is a longitudinal sectional elevational view, partly diagrammatic, of an apparatus for practicing the method of the present invention.

The apparatus which will be described hereinafter is only exemplary of several forms of apparatus which may be used in practicing the invention, and illustrates rather schematically the adaptation of the invention to existing forehearth constructions.

*Preparation of the base glass*

The base glass preferably used in practicing the present invention is essentially a conventional glass of the type commonly utilized in the manufacture of colorless containers. The oxides in the ranges and percentages thereof fall within the following ranges:

TABLE I

| Oxide: | Percent by weight |
|---|---|
| $SiO_2$ | 60–75 |
| $Al_2O_3$ | 0.3–10 |
| $CaO+MgO$ | 6–15 |
| $Na_2O$ | 12–18 |
| $K_2O$ | 0–5 |
| $BaO$ | 0–5 |
| $Fe$ | .00025–.0035 |

Base glass compositions coming within the ranges above given in Table I, can be used with the various frit compositions and metallic salts herein specified. It is often desirable that the percentages of the various oxides comprising the frit composition be substantially the same as the percentages of the same oxides as in the base glass compositions with which they are used.

The following Examples 1 and 2 in Table II, are soda-lime flint batches which may be used in making the molten base for colorless glass in the present invention:

TABLE II

| Oxides | Example 1 (Percent by Weight) | Example 2 (Percent by Weight) |
|---|---|---|
| $SiO_2$ | 72.01 | 71.45 |
| $Al_2O_3$ | 1.74 | 1.32 |
| $Fe_2O_3$ | .039 | .037 |
| $TiO_2$ | .029 | .013 |
| $CaO$ | 11.38 | 8.32 |
| $MgO$ | 1.15 | 5.58 |
| Alkalies | 13.65 | 13.28 |
| Selenium | .00025–.00030 | .00025–.00035 |

The invention employs the manufacture of a colorless (flint) molten base glass of the composition indicated in Table I. The conditions and procedures for making such molten base glasses are conventional and such conditions are known to those skilled in the art, as exemplified in Table IX, B-11, on page 245 of "Handbook of Glass Manufacture" by Tooley, Ogden Publishing Company, New York, New York, 1953. "Glass Engineering Handbook," by Shand McGraw-Hill Book Company, New York, New York, 2nd Ed., 1958, Chapter 7, specifically pages 157–161.

Generally the base glass issues from the melting tank or refiner and enters the forehearth at a temperature of from about 2300° F. to about 2600° F., and this temperature is well adapted for the addition of the molten frit.

It will be noted that the base glass compositions may contain other minor ingredients, such as selenium, as is commonly practiced in manufacture of a colorless "milk-bottle" pink glass. Also, ferrous ($Fe++$) iron as an impurity may be present in the batch from which the glass is melted and the herein indicated analysis consolidates all the iron content as calculated $Fe_2O_3$. The FeO content, usually introduced as a sand impurity, is generally held to less than about 0.02% by weight as a quality control measure.

Several different frit compositions may be added to the base glasses in the forehearth. These are given hereinafter and each represent a frit composition manufactured readily in a day tank by adding the following batches into the day tank or unit melter, in which the frit composition is melted under oxidizing fining conditions (oxidizing atmosphere in melter), such melt being carried on so that the glass temperature of the melted frit is in the range 2700–2780° F. The melted colorant frit is fed as a molten stream from an outlet from the melter and chilled rapidly, such as by feeding it into a body of water, so that the frit breaks up into granulated form. A suitable frit making apparatus is disclosed in William B. Silverman's application Ser. No. 718,024, filed Feb. 27, 1958 now U.S. Patent No. 2,955,384. The granulated colorant frit in dried granular form is fed to the forehearth of the main tank for colorizing the clear base glass.

TABLE III

| Frit Batches (in lbs.) | A | B | C | D [1] | E [2] |
|---|---|---|---|---|---|
| Sand | 2,000 | 2,000 | 2,000 | 2,000 | 2,000 |
| Soda Ash | 675 | 656 | 656 | 693 | 690 |
| Limestone | 632 | 632 | 632 | 520 | 450 |
| Sodium Nitrate | 40 | 60 | 40 | 27 | 0 |
| Iron Chromite | 75 | 58 | 75 | 96 | 0 |
| Pot. Dichromate | 30 | 49.5 | 30 | 0 | 0 |
| Cobalt Oxide | 3.25 | 2.8 | 3.25 | 3 | 17.15 |
| Arsenic | | | | 27 | |
| Frit Batch, Theoretical Analysis (Percent by Weight): | | | | | |
| $SiO_2$ | 70.4 | 69.94 | 70.11 | 71.33 | 70.78 |
| $Na_2O$ and $K_2O$ | 14.19 | 14.63 | 14.19 | 14.53 | 16.15 |
| CaO | 12.03 | 12 | 12.03 | 10.25 | 9.63 |
| $Al_2O_3$ | .56 | .47 | .56 | .79 | 2.62 |
| $Fe_2O_3$ | .79 | .62 | .79 | .96 | .041 |
| MgO | .44 | .38 | .44 | .45 | .15 |
| $TiO_2$ | .069 | .069 | .069 | .035 | .030 |
| $Cr_2O_3$ | 1.69 | 1.78 | 1.69 | 1.5 | 0.0 |
| $Co_3O_4$ | .113 | .098 | .113 | .100 | 0.60 |
| Percent Weight of Colorant Oxides in Melted Frit: | | | | | |
| $Cr_2O_3$ | 1.42 | 1.46 | 1.53 | 1.52 | 0.0 |
| $Co_3O_4$ | .092 | | .093 | .09 | 0.5 |

[1] Frit "D" is a Georgia Green frit used in production for the manufacture of a Georgia Green final glass by addition of colorant in the forehearth to flint glass of soda-lime composition.
[2] Frit "E" would be supplemented with 31.5 lbs. potassium dichromate (per 100 lbs. frit). This supplemented frit would then be fed to forehearth at 30 #/hr. for 40 ton pull—producing an ultraviolet radiation absorbing type glass in which the $Cr_2O_3$ content is 0.14% by weight.

In the manufacture of colored glasses, and particularly green glasses, certain specified color standards must be met. Such standards are usually defined in terms of "purity," "dominant wave length" and "brightness."

The "purity" of the glass as used herein specifies that percentage of the light transmitted that is within the dominant wave length range for a particular glass color. The glass absorbs the remaining light of that wave length. For example, using a Georgia Green glass of commercially acceptable specification, light of the wave length 515–545 millimicrons is the "dominant wave length" range of the light of that color and if "purity" is indicated as 5%, this means 5% of the light within that dominant wave length range is being transmitted by the glass. The remaining 95% of that wave length is absorbed by the glass.

"Brightness," on the other hand, as referred to herein, is stated as a percentage of total light transmission by the glass. If Georgia Green glass has a 75% "brightness" characteristic, it transmits 75% of the light of all wave lengths.

TABLE IV.—COLORING CONSTITUENTS IN FINAL COLORED GLASSES

| | Georgia Green | Rum Green | Emerald Green |
|---|---|---|---|
| Constituent (percent): | | | |
| $Fe_2O_3$ | .04–.06 | .05–.07 | .175–.25 |
| $Cr_2O_3$ | .015–.021 | .031–.037 | .14–.24 |
| CoO | .0009–.0011 | .0013 | .002–.006 |
| Industry Optical Standards: | | | |
| Dominant Wave Length (μ) | 515–545 | 542–555 | 550–562 |
| Purity (percent) | 2–5 | 6–8 | 55–80 |
| Brightness (percent) | 70–80 | 67–70 | 26–42 |

The method employed in the invention consists in flowing the base glass, for example, the melted and refined molten colorless (flint) glass of Table II, Example I, above, into the forehearth 10 from the refiner chamber 11 of a continuous tank type furnace. The forehearth is connected to the refiner 11 at the inlet 12. A plurality of forehearths may be connected with the tank. The molten glass 13, referred to herein as the base glass, flows from the tank over a dam 14 into a channel extending the length of the forehearth. A funnel spout or spouts 15 is inserted through the roof blocks of the forehearth at a location opposite dam 14. A frit feeder unit 16 is mounted to discharge the frit in pulverant form of the type disclosed in Table IV herein into the spout at a regulated rate to achieve the desired feeding rate for production of a colored glass, such as hereinafter disclosed in Tables V–VII. The frit feeder unit 16 has an upper hopper 17 and a lower horizontally disposed feeding mechanism 18 driven by a motor 19. This feeder is effective to dispense colorant frit material from hopper 17 into the spout 15 and onto the surface of the glass 13 over dam 14. The rate of addition is calibrated to and variable by the speed of motor 19 and the output of the feeder 18.

A second feeder unit 20 is mounted to discharge the inorganic metallic salt material in pulverant form, such as disclosed herein, into the spout 15 at a similarly regulated rate to achieve the desired rate in conjunction with the feeding of the frit by the mechansm 18 for production of the colored glass, such as is disclosed in Tables V–VII. This feeder unit 20 has an upper hopper 21 and a lower horizontally disposed feeding mechanism 22 driven by a motor 23. The feeder is effective to dispense the metallic salt material from the hopper 21 into the spout 15 and onto the surface of the glass 13 over dam 14.

The two materials, i.e., the frit and metallic salt, during its passage through the heating section 24 of the forehearth is melted and mixed to some extent with the base glass. This mixture then flows over dam 25 and into stirring devices 26 (there preferably being a plurality of these) which effect further mixing of the glass constituents. A deep skimmer 27 is spaced from stirrers 26 which alters the top to bottom flow of the glass and retains it in the mixing area 28 which is then fed into the second stirrers 29 located between skimmer 27 and a second dam 30. This stirring action in the second stirring area 31 and flow of the glass results in dispersion of the melted frit and metallic salt homogeneously in the glass which is conditioned further in the cooling and conditioning section 32 and discharged at an outlet 33. The discharge of the glass is under the control of a feeder mechanism 34 by which measured charges or gobs of glass are severed by conventional means (not shown) from the supply body and delivered to a forming machine.

The base glass enters the forehearth 10 at the inlet 12 at a temperature from about 2250° F. to about 2600° F., and this temperature is well adapted for the addition of the frit and the inorganic metallic salt selected for its melting point less than the operating temperature being used in the forehearth. The frit and metallic salt being added is in finely divided form, e.g., from −8 to +30 mesh. In some instances, it is possible to increase the forehearth temperatures in the forward or melting section at the point of addition. For example, glass at a tank temperature of 2250° F. may be increased to 2350° F. at the forehearth addition point and the temperatures thereafter diminish along the length of the forehearth to an outlet temperature of 2070° F. The herein disclosed forehearth is suitable for such operation.

In producing the above colored final glasses, indicated by Table IV, the following data of Tables V–VII are examples of the additions to be made under the invention in producing the exemplary colored glasses, which are standard colors produced in the glass container industry. The additions are expressed in terms of producing a ton of the colored final glass indicated.

TABLE V (GEORGIA GREEN)

To produce Georgia Green wherein the $Cr_2O_3$ content of the final colored glass is to be maintained at about .016% by weight, and CoO at about 0.001% by weight, the following colorants are added to the base glass in the forehearth per ton of glass produced.

| Frit Composition | Amount (Pounds), Per Ton of Glass | $K_2(Cr_2O_3)$, Pounds Added | $Na_2(Cr_2O_3)$, Pounds Added |
|---|---|---|---|
| Frit A | 5.28 | .475 |  |
| Do | 5.28 |  | .475 |
| Do | 10.6 | .328 |  |
| Do | 10.6 |  | .328 |
| Frit B | 5.13 | .475 |  |
| Do | 5.13 |  | .475 |
| Do | 10.28 | .328 |  |
| Do | 10.28 |  | .328 |
| Frit C | 4.90 | .475 |  |
| Do | 4.90 |  | .475 |
| Do | 9.80 | .328 |  |
| Do | 9.80 |  | .328 |
| Frit D | 4.9 | .475 |  |
| Do | 4.9 |  | .475 |
| Do | 9.8 | .328 |  |
| Do | 9.8 |  | .328 |
| Frit E [1] | 3.3 | 0.62 |  |
| Do | 3.3 |  | 0.62 |

[1] Frit "E" supplies only CoO. The total $Cr_2O_3$ is supplied by K or Na salts.

TABLE VI (RUM GREEN)

To produce Rum Green wherein the $Cr_2O_3$ content of the final colored glass is to be maintained at about 0.034% by weight, the following colorants are added to the base glass in the forehearth per ton of glass produced.

| Frit Added | Amount (Pounds) Per Ton of Glass | $K_2(Cr_2O_3)$ or $Na_2(Cr_2O_3)$ (Pounds Added) |
|---|---|---|
| Frit A | 11.95 | 0.994 |
| Do | 23.95 | 0.66 |
| Frit B | 11.65 | 0.994 |
| Do | 23.3 | 0.66 |
| Frit C | 11.1 | 0.994 |
| Do | 22.2 | 0.66 |
| Frit D | 15.15 | 0.994 |
| Do | 30.3 | 0.66 |
| Frit E [1] | 4.33 | 1.32 |

[1] Frit "E" supplies only CoO. The $Cr_2O_3$ is supplied wholly from the K or Na salts.

TABLE VII (GREEN ULTRAVIOLET ABSORBING)

To produce Emerald Green glass wherein the $Cr_2O_3$ content of the final colored glass is to be maintained at about 0.17% by weight, and CoO is 0.005% by weight, the following colorants are added to the base glass in the forehearth per ton of glass produced.

| Frit Added | Amount (Pounds) Per Ton of Glass | $K_2(Cr_2O_3)$ or $Na_2(Cr_2O_3)$ (Pounds Added) |
|---|---|---|
| Frit A | 60 | 4.95 |
| Do | 120 | 3.3 |
| Frit B | 58.2 | 4.95 |
| Do | 116.4 | 3.3 |
| Frit C | 55.5 | 4.95 |
| Do | 111.0 | 3.3 |
| Frit D | 75.9 | 4.95 |
| Do | 151.8 | 3.3 |
| Frit E | 16.6 | 6.6 |

The invention also contemplates forming a final colored composite glass starting with a molten base glass of substantially less coloration than the desired final glass to be produced. For example, a green glass composition of a lesser coloration as a Georgia Green glass containing a colorant of about 0.016% by weight of $Cr_2O_3$ may be prepared, melted and introduced into the forehearth as the base glass. To this will be added a lesser quantity than the earlier proposed addition rate of the combination of the frit and the potassium dichromate or sodium dichromate salts so as to produce the deeper colored final composite green glasses containing, for example, either 0.034% by weight $CR_2O_3$ in the final glass (Rum Green) or 0.17% by weight $CR_2O_3$ in the final glass (Green Ultraviolet Absorbing).

Various modifications may be resorted to within the spirit and scope of the appended claim.

I claim:

The method of manufacturing a green colored glass comprising the step of melting an essentially soda-lime base glass to molten state having a composition in the range of:

| Oxide: | Percent by weight |
|---|---|
| $SiO_2$ | 60–75 |
| $Al_2O_3$ | .3–10 |
| CaO+MgO | 6–15 |
| $Na_2O$ | 12–18 |
| $K_2O$ | 0–5 |
| BaO | 0–5 | adding to said base glass while the latter is flowing in a stream through a channel, a colorant mixture composed of a colorant enriched glass frit containing $Cr_2O_3$ in the range 1.53–0.0% by weight and $Co_3O_4$ of about .09–0.5% by weight and an inorganic metallic salt selected from the group consisting of potassium dichromate, potassium chromate, sodium dichromate and sodium chromate, and admixing the colorant mixture of said frit and said metallic salt with the molten base, to form a composite colored glass, the colorant mixture being added in a proportioned amount to the molten base glass to produce a $Cr_2O_3$ content of the final colored glass in the range of 0.016–0.17% by weight.

References Cited

UNITED STATES PATENTS

| 2,916,387 | 12/1959 | Commons | 106—47 |
| 2,923,636 | 2/1960 | Swain | 106—52 |
| 3,024,121 | 3/1962 | Hagedorn | 65—121 |
| 3,291,621 | 12/1966 | Hagedorn | 106—54 |

DONALL H. SYLVESTER, *Primary Examiner.*

F. W. MIGA, *Assistant Examiner.*